O. ZERK.
GREASE CUP.
APPLICATION FILED APR. 10, 1913.

1,227,731.

Patented May 29, 1917.

WITNESSES
Justin W Macklin
R. L. Bruck.

INVENTOR:
Oscar Zerk,
BY Albert H. Baker
ATTY

UNITED STATES PATENT OFFICE.

OSCAR ZERK, OF CLEVELAND, OHIO, ASSIGNOR, BY MESNE ASSIGNMENTS, TO GEORGE W. BOWEN, OF AUBURN, NEW YORK.

GREASE-CUP.

1,227,731.      Specification of Letters Patent.      Patented May 29, 1917.

Application filed April 10, 1913. Serial No. 760,244.

*To all whom it may concern:*

Be it known that I, OSCAR ZERK, a subject of the Emperor of Austria, residing at Cleveland, in the county of Cuyahoga and State of Ohio, have invented a certain new and useful Improvement in Grease-Cups, of which the following is a full, clear, and exact description, reference being had to the accompanying drawings.

This invention relates to grease cups of the type wherein there are two members secured together so that they may be separated for filling but stationary in service. The object of the invention is to provide a simple and efficient spring detent adapted to be carried within the grease cup and lock the members together against inadvertent displacement, while allowing their separation by the application of the usual force whenever desired. My spring detent comprises a leaf spring held in one member and engaging the other, the spring having a peculiar form to provide a comparatively long spring arm and thus give an effective spring action within a confined space. The invention is hereinafter more fully explained and its essential characteristics are summarized in the claims.

Figure 1:
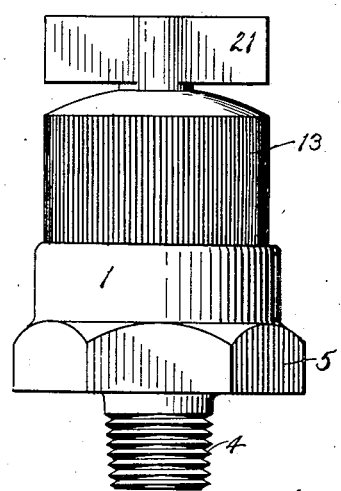
Figure 2:
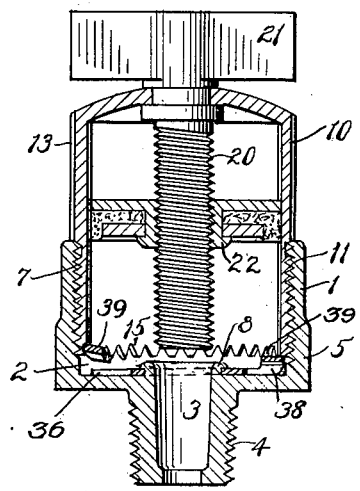
Figure 4:
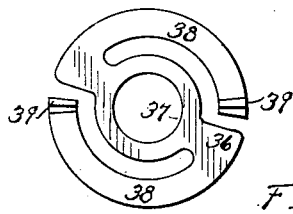
Figure 3:
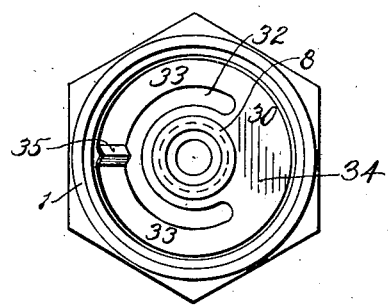

In the drawing, Figure 1 is a side elevation of a grease cup embodying my invention; Fig. 2 is a vertical central section thereof; Fig. 3 is a plan of the cup member of the grease cup, the form of spring detent shown being different from that illustrated in Fig. 2; Fig. 4 is a plan and Fig. 5 a perspective view of the form of detent spring shown in Fig. 2; Fig. 6 is a perspective view of the form of said detent shown in Fig. 3.

Referring by numerals to the parts shown in the drawing, 1 represents the cup or base provided with an interior chamber 2 and an exit opening 3, the latter being the bore of a nipple depending from the bottom of the base and having an external thread 4. The cup is shown as having an angular exterior 5 near its bottom, and an annular flange 6 rising from said bottom and provided with internal threads 7, said threads 7 and 11 constituting parts interlocking by the relative rotation of the base and the cap.

The cap is designated 10. It has a cylindrical wall with external threads 11, which screw into the threads 7. The cap is provided with suitable nurling 13, by which it may be turned into place.

20 indicates a screw journaled in the top of the cap 10 and shown as provided above the cap with a handle or turning wing 21. Within the cap is a plunger 22 threaded on the screw 20, and preferably guided at the edge by one or more grooves in the wall of the cap. The plunger is thus adapted to feed the grease when the handle 21 is turned.

The parts above described may be of any approved construction adapted for coöperation with my peculiar detent spring, which I will now describe. This detent spring is somewhat similar to a washer.

Preferably, the detent spring is held in the bottom of the cup or base 1 and engages notches on the lower edge of the side wall of the open end of the cap. The form of the spring shown in Figs. 3 and 6 is designated 30, and consists of an attaching part and yielding arms. The attaching part of the spring 30 is provided with a central or axial opening 31 substantially concentric with the flange 6 of the base 1, that is, substantially concentric with the longitudinal axis of the base and the cap, and said attaching part is also provided with an arm or portion 34 projecting radially at one side of said opening nearly to the inner face of the flange 6. Said spring 30 is also provided about a portion of the opening 31 with an arc-shaped or substantially horseshoe-shaped opening 32, which terminates at opposite sides of the radial arm 34, and leaves two arcuate or circuitous arms 33 substantially concentric with the flange 6, the side wall of the cap 10 and the opening 31, and extending laterally from opposite edges of the outer end of the arm 34 beneath the notched edge of said cap 10 and coming together adjacent to the mid-point of the horseshoe-shaped opening 32. At this point the arms 33 connect together by an upward V-shaped projection 35 ratcheting with said notched edge of the cap 10. The arms 33 are normally bent upward from the plane of the attaching part of the spring. The spring is held in the cup 1 by means of an annular flange 8 rising from the base of that cup around the inlet end of the exit 3 and extending through the opening 31 and having an outward projecting edge overhanging the top of the disk attaching part of the spring. Such construction holds the spring in position upon the bottom of the cup, where the projection 35 is adapted to engage any of the notches 15 on the lower edge of the cap wall.

Figure 5:
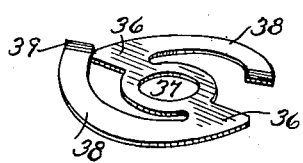
Figure 6:
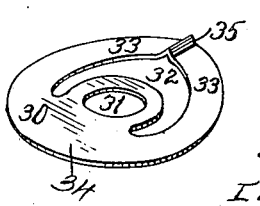

Figs. 4 and 5 show a form of the washer-like spring which may be employed in place of the spring 30. In these views, 36 indicates what may be called the attaching part of the spring, consisting of an annular portion extending around the opening 37 and two diametrically opposite projecting radial arms. From these radial arms extend, in opposite directions, the arcual arms 38, which are provided near their ends with projections 39. As in the case of the spring 30, this spring is held by the flange 8 of the base, which occupies the opening 37. Like the arms 33, the arms 38 bend upwardly from the point where they leave the attaching part or body of the spring to the projections 39, and these projections are adapted to coöperate with any of the notches 15 of the cap.

It will be seen that, whichever form of spring is used, there are comparatively long spring arms extending from the anchored end of the arm to the projection which engages the cap, the length of these arms being increased by reason of the circuitous course of the arms from their anchored ends to the projection. This gives an effective locking throughout a considerable range of movement of the cap, and, at the same time, allows the spring to be mounted in a confined space. The securing of the spring to the base by the peening over of the flange 8 is simple and effective.

Having thus described my invention, what I claim is:

1. In a grease cup and in combination, a base having a flange, a cap having its open end fitting within the flange, said flange and cap being provided with parts interlocking by the relative rotation of the base and the cap, and a member for resisting such relative rotation, the member being fixed to the base and provided with an arm ratcheting with the wall of the open end of the cap, a portion of the arm being substantially concentric with said wall, said portion being fixed at one end and having its other end free and coacting with the open end of the cap, substantially as and for the purpose described.

2. In a grease cup and in combination, a base having a flange, a cap having its open end fitting within the flange and notched on its lower edge, said flange and cap being provided with parts interlocking by the relative rotation of the base and the cap, and a member for resisting such relative rotation, the member being fixed to the base and provided with an arm underlying the notched edge of the cap and ratcheting therewith, a portion of the arm being substantially concentric with said notched edge, said portion being fixed at one end and having its other end free and coacting with the open end of the cap, substantially as and for the purpose specified.

3. In a grease cup and in combination, two elements, one a base having a flange, and the other a cap having its open end fitting within the flange, said flange and cap being provided with parts interlocking by the relative rotation of the base and the cap, and a member for resisting such relative rotation, the member being fixed to one of the elements and provided with a substantially radial arm, and a second arm projecting laterally from the first-mentioned arm and ratcheting with the other element, substantially as and for the purpose set forth.

4. In a grease cup and in combination, two elements, one a base having a flange, and the other a cap having its open end fitting within the flange, said flange and cap being provided with parts interlocking by the relative rotation of the base and the cap, and a member for resisting such relative rotation, the member having a part thereof arranged substantially radial with the flange and fixed to one of the elements, and provided with an arm projecting from such part and ratcheting with the other element, substantially as and for the purpose specified.

5. In a grease cup and in combination, two elements, one a base having a flange, and the other a cap having its open end fitting within the flange, said flange and cap being provided with parts interlocking by the relative rotation of the base and the cap, and a member for resisting such relative rotation, the member having a part thereof arranged substantially radial with the flange and fixed to one of the elements and provided with an arm also arranged substantially concentric with the flange and having one end fixed relatively to said part and its other end ratcheting with the other element, substantially as and for the purpose set forth.

6. In a grease cup and in combination, two elements, one a base having a flange, and the other a cap having its open end fitting within the flange, said flange and cap being provided with parts interlocking by the relative rotation of the base and the cap, and a member for resisting such relative rotation, the member having a part thereof fixed to one of the elements and provided with a substantially radial arm projecting from said part, and with a second arm projecting laterally from the outer end of the first-mentioned arm substantially concentric with the flange and ratcheting with the other element, substantially as and for the purpose described.

7. In a grease cup, the combination of an internally threaded cup, an externally threaded cap screwing into the cup and having notches on its lower edge, and a disk-like leaf spring within the cup, said spring having a central opening and a circuitous arm arranged substantially concentric of the opening and carrying an upward projection adapted to coact with the notches, said cup having an annular member within the central opening and securing the spring to the cup.

8. The combination of a cup and cap screw threaded one into the other, the inner member, having notches on its edge, and a detent spring secured to the other member and having a central opening for the passage of securing means, and an arc-shaped opening about the central opening leaving a circuitous arm outside of the arc-shaped opening, said arm having a projection to coact with the notches.

9. The combination, with a cup and cap screw threaded one into the other, the inner member having a notch on its end, and a disk-like leaf spring secured within the other member, said spring having a central opening through which securing means passes and having two arc-shaped arms substantially concentric of the central opening and separated therefrom, the end portions of said arms being adapted to coact with the notch in the inner member.

10. In a grease cup, the combination of a cup and cap screw threaded together, the cap having notches in its wall and the cup having a discharge opening, and a leaf spring surrounding the opening and having a circuitous arm carrying a projection, the spring being secured to the cup by the wall of said opening, and the projection coacting with said notches.

11. In a grease cup, the combination, of a cup having a wall internally threaded, a cap having a coacting wall externally threaded, the cup having a discharge bore and having a flange rising from the bottom of the cup about such bore, and a washer-like leaf spring surrounding said flange and held to the cup and provided with one or more arcual openings substantially concentric of the central opening leaving one or more arcual arms, said arms and cap having coöperating engageable shoulders.

12. In a device of the character described, the combination, with two members screw threaded together, one of the members carrying notches, of a detent spring secured to the other member, said spring having a central opening for the passage of securing means and having concentric of this opening an arcual opening, and having outside of the arcual opening a circuitous arm which, at one end merges with the body of the spring and at the other end carries means to coöperate with the notches.

13. The combination, with a cup and cap screw threaded one into the other, the inner member having notches on its edge, of a disk-like detent spring secured to the other member and having means coöperating with the notches, said spring having an arcual opening concentric of the center providing an arcual arm, which at one end merges with the body of the spring, said means for coöperating with the notches being carried by the other end of said arm.

In testimony whereof, I hereunto affix my signature in the presence of two witnesses.

OSCAR ZERK.

Witnesses:
ALBERT H. BATES,
BRENNAN B. WEST.

---

It is hereby certified that in Letters Patent No. 1,227,731, granted May 29, 1917, upon the application of Oscar Zerk, of Cleveland, Ohio, for an improvement in "Grease-Cups," errors appear in the printed specification requiring correction as follows: Page 1, line 48, after the reference-numeral "7" insert a period, and commencing with the word "said", same line, strike out all to and including line 50; same page, line 53, as now numbered, after the reference-numeral "7" strike out the period and insert a comma and the words *said threads 7 and 11 constituting parts interlocking by the relative rotation of the base and the cap.;* and that the said Letters Patent should be read with these corrections therein that the same may conform to the record of the case in the Patent Office.

Signed and sealed this 26th day of June, A. D., 1917.

[SEAL.]

R. F. WHITEHEAD,
*Acting Commissioner of Patents.*

Cl. 184—38.